United States Patent [19]

Weikert

[11] 4,231,832
[45] Nov. 4, 1980

[54] PROCESS OF MANUFACTURING LAMINATED WEB

[76] Inventor: Roy J. Weikert, 2000 Schlater Dr., Sidney, Ohio 45365

[21] Appl. No.: 874,794

[22] Filed: Feb. 3, 1978

[51] Int. Cl.² ............................................. B29D 23/04
[52] U.S. Cl. ........................... 156/244.14; 156/244.18; 156/244.19; 156/244.23; 156/244.24; 156/244.25; 156/244.27
[58] Field of Search .............. 156/243, 244.11, 244.12, 156/244.13, 244.14, 244.15, 244.27, 500, 244.18, 244.19, 244.23, 244.25; 264/94, 95; 425/133.1; 53/170, 172, 434, 435, 443

[56] References Cited

U.S. PATENT DOCUMENTS

| | | | |
|---|---|---|---|
| 2,962,843 | 12/1960 | Hoelzer et al. | 264/95 |
| 3,094,449 | 6/1963 | Sisson | 156/244.14 |
| 3,467,565 | 9/1969 | Utz | 156/243 |
| 3,532,571 | 10/1970 | Ausnit | 156/500 |
| 3,551,243 | 12/1970 | Schuur et al. | 156/244.14 |

*Primary Examiner*—Caleb Weston
*Attorney, Agent, or Firm*—Biebel, French & Nauman

[57] ABSTRACT

The gas and light barrier properties of a web of thermoplastic bags designed for aseptic packaging are improved by laminating a material of high gas and light imperviousness, such as metal foil, to the thermoplastic bag material during a blown film extrusion process. In one embodiment a pair of foil laminates are applied to opposite sides of the inflated length of a blown tube between the extruder and a first pair of nip rolls, with the laminates being pressed into opposite sides of the inflated tube by rollers which flatten the tube at their points of contact to provide flat surfaces for the laminates being applied to the tube. The resulting laminated web has a pair of aligned, uncovered strips running the length of the web along which a slit-seal is made to provide a pair of webs each having a layer of foil or other material laminated to all but one longitudinal edge thereof. In another embodiment a single sheet of foil is applied to a tube of film using, for example, a conventional tube former, with the foil wrapping less than the full circumference of the tube to provide a single web having an uncovered section running longitudinally thereof.

13 Claims, 5 Drawing Figures

FIG-4
FIG-5
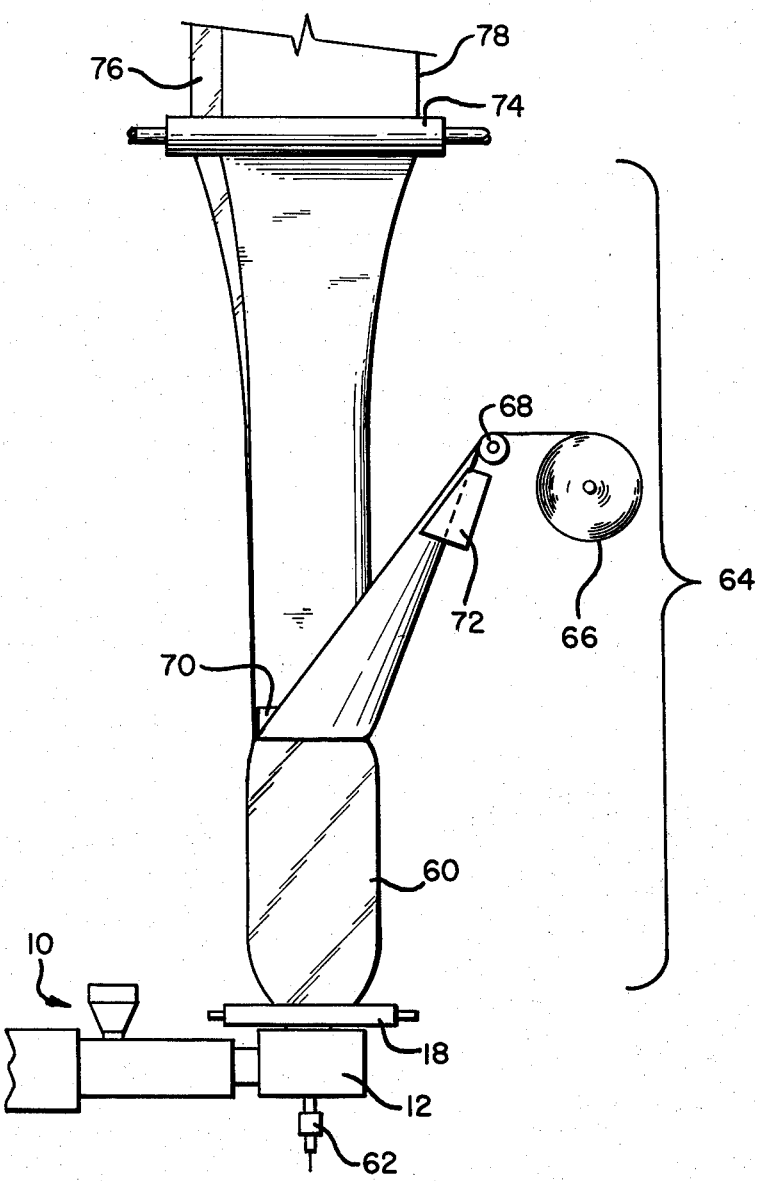
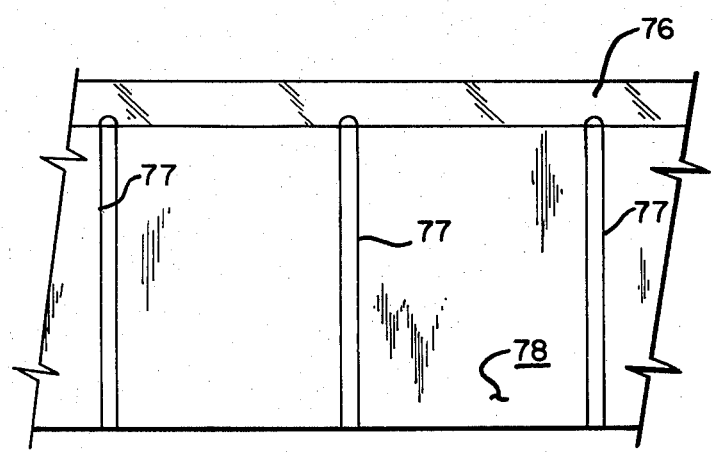

PROCESS OF MANUFACTURING LAMINATED WEB

BACKGROUND OF THE INVENTION

In Applicant's prior U.S. Pat. No. 4,021,283 dated May 3, 1977, a system is disclosed for aseptic packaging. This system includes a web of bags which can be manufactured with sterile interiors and subsequently filled and sealed without exposure of the sterile bag interiors to contaminating organisms.

The web of bags is formed as a system of interconnected bags which communicate with a common, continuous passage extending across the mouths of the bags and through which the filling process is performed. The filling pipe for the system is inserted in this passage to fill the bags without exposing their interiors to ambient. The mouths of the bags are then sealed while the pipe is still positioned in the passage, the web of bags severed beneath the pipe and the resulting offal reclaimed for reprocessing.

In some environments and particularly when packaging certain types of food stuffs, it is desirable to provide a high degree of gas and light imperviousness. While the thermoplastic materials which may be advantageously used in the system disclosed in Applicant's above noted prior patent provide excellent moisture vapor and bacteria barrier properties, generally such materials do not provide a high degree of gas and light imperviousness.

To overcome this deficiency it has been proposed that material having these properties be laminated to a sterile tube of thermoplastic material. One type of material which provides the degree of gas and light impermeability desired is metal foil.

In prior applications metal foil has been applied to preformed sheets or other stock forms of thermoplastic material. Generally this is accomplished by first bonding to the foil a material which then serves to adhere the foil to the thermoplastic material.

In U.S. Pat. No. 2,962,843, dated Dec. 6, 1960, a process is disclosed for shaping about an extruded tube of film a concentric tube of paper or other material which extends completely about the extruded tube and is provided with a lap or other type seam. In the composite tube formed in accordance with the process disclosed in U.S. Pat. No. 2,962,843 the outer layer of paper or other material is completely co-extensive with the inner film layer throughout the entire circumference of the tube.

Thus, if a tube of this type were somehow adapted to a system of the type disclosed in Applicant's above noted prior patent, the filling operation would not be visible, a portion of the outer layer of material would be wasted in the subsequent severing operation following filling and sealing, and the inner layer of thermoplastic material would not be readily reclaimable, of which the latter two are important economic considerations.

SUMMARY OF THE INVENTION

The present invention provides a laminated web of bags and a process for manufacturing the web of bags which results in a product ideally suited for use in an aseptic packaging system of the type disclosed in Applicant's prior U.S. Pat. No. 4,021,283.

Specifically, a layer or layers of a material which possesses the properties desired to be added to the basic film tube of thermoplastic material are applied to the inflated length of the tube which extends between the extruder and a first pair of nip rolls.

In one embodiment of the invention, two strips of foil or other laminate material are pressed against opposite sides of the inflated tube by rollers which shape the tube into a pair of flattened portions receptive to the application of the foil laminates.

The laminates applied to the film may be multi-layer products consisting of, for example, metal foil, paper and a polyolefin, with possibly an additional layer of paper and/or polyolefin material covering the foil. When using a material of this general type the laminate may be heated as it is fed to the tube to render the polyolefin layer adjacent the tube fusible to the material of the blown tube. While particular types of multi-layer laminates are described for illustration only it will be apparent that the materials utilized are selected for the properties desired to be imparted to the resultant laminated web.

Following application of a pair of strips of laminate material to opposite sides of the tube, the inflated tube can be allowed to reassume its substantially cylindrical form. Thereafter it is flattened by, for example, a pair of nip rollers having their axes perpendicular to the axes of the laminate applying rollers to provide a flattened laminated web. The width of the laminates applied to the tube are selected with respect to the circumference of the tube such that opposed longitudinal edges of the laminate strips are spaced from each other to provide an uncovered portion of the tube at opposite sides thereof which appear in the flattened web as a pair of aligned, longitudinally extending sections disposed medially of the longitudinal edges of the flattened web.

The flattened web is then slit-sealed by any one of a number of processes, such as a conventional hot wire process, so that the flattened web is coverted into a pair of webs each having a sealed but uncovered longitudinal edge.

Either prior or subsequent to the slit-seal operation transverse seal lines are formed at periodic intervals along the flattened web or webs extending from each of the covered longitudinal edges of the web, toward but not entirely across the uncovered sections. Regardless of whether the transverse seal operation occurs prior or subsequent to the slit-seal step, the end result is a pair of webs of bags each having a longitudinally extending, uncovered section which forms a continuous passage for the reception of a filling pipe in a subsequent filling and sealing operation.

While in the preferred embodiment of the invention a pair of strips of laminate are applied to opposite sides of the inflated tube, in an alternate embodiment a single layer of material having a width less than the circumference of the tube can be passed over a forming surface which shapes the strip of laminate into a configuration approximating that of the blown tube and by, for example, heating, adheres the laminate to the tube with opposite longitudinal edges of the laminate being spaced from each other to provide an uncovered portion of the tube. A web formed in this manner is thereafter provided with transverse seams as described above to provide a single laminated web of bags.

In both embodiments it will be noted that it is unnecessary for the laminates to be adhered throughout their entire surface to the tube to which they are laminated to obtain the additional properties associated with the laminate, such as the gas and light imperviousness associated with a foil laminate.

Thus, since in the subsequent transverse sealing operation the outer laminate is sealed to the tube as the opposed walls of the tube are sealed to each other to form a series of individual bags in the web and, following filling of the bags a longitudinal seal closes the mouths of the bags and seals the outer laminate to the underlying tube material and opposed inner surfaces of the tube at the bag mouths to each other, it is unnecessary that the laminates and the tube be interbonded throughout their contact areas.

BRIEF DESCRIPTION OF THE DRAWINGS

FIG. 4 is an elevational view showing the application of a single laminate to a tube of film; and FIG. 5 is a view showing a portion of a web of laminated bags.

DESCRIPTION OF THE PREFERRED EMBODIMENTS

Figure 1:
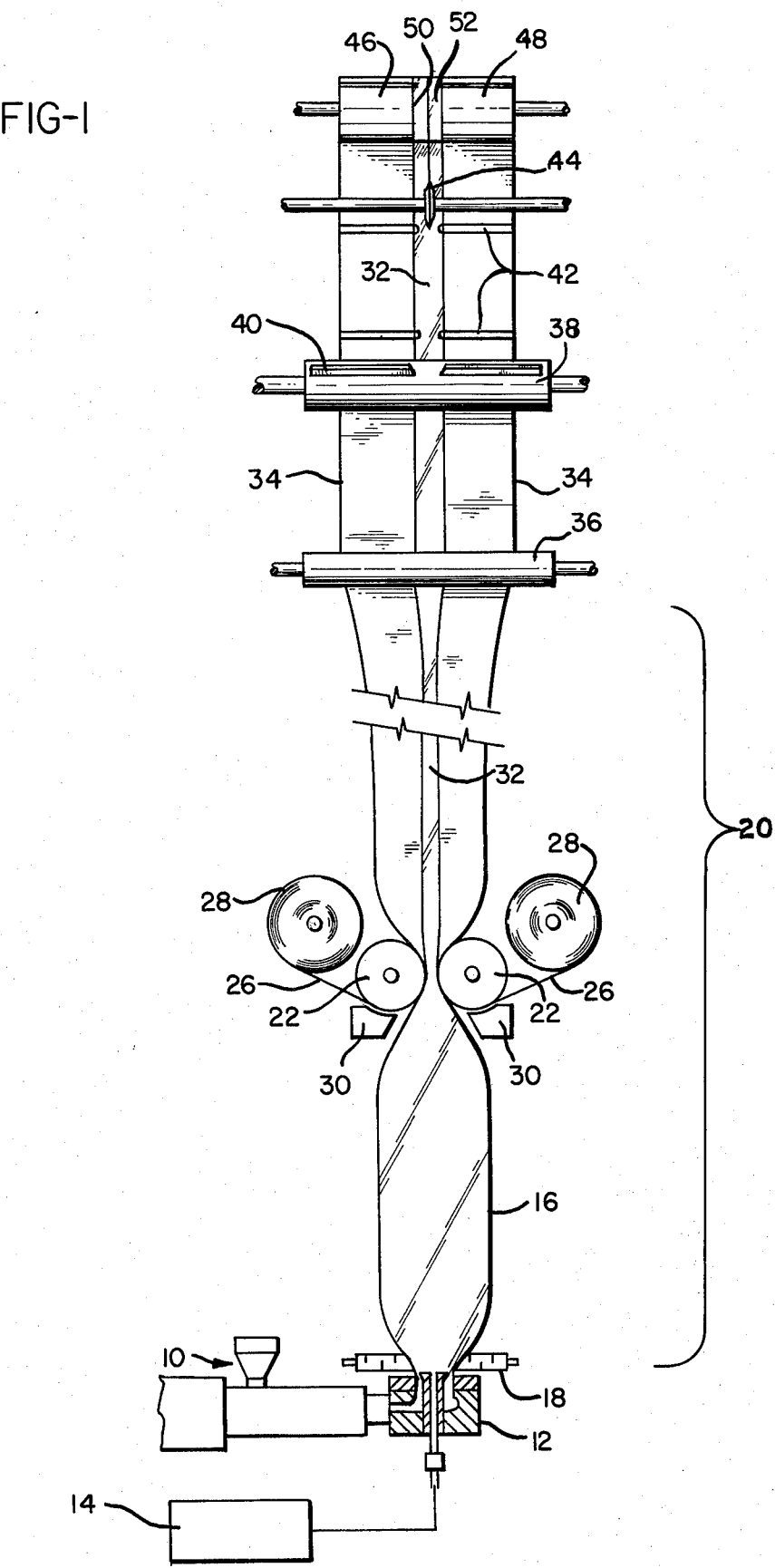
FIG. 1 is an elevational view showing a preferred embodiment of the invention.
Figure 2:
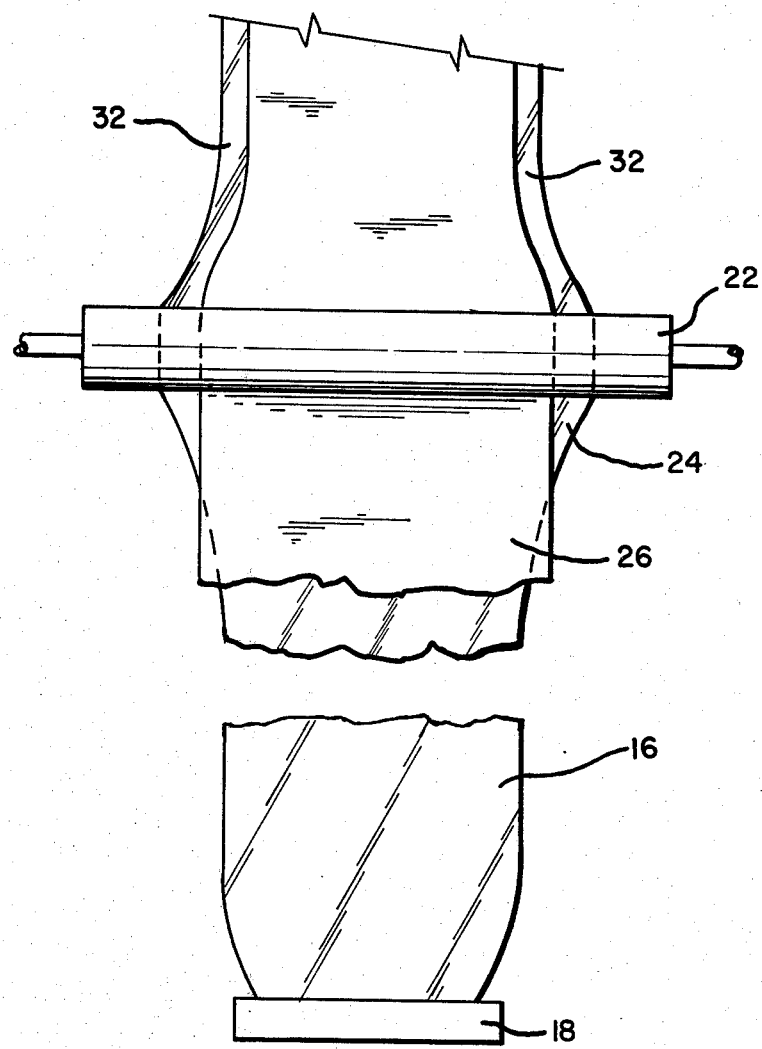
FIG. 2 is a partial side view showing the application of a foil laminate to a flattened portion of a blown film tube.

Turning initially to FIGS. 1 and 2 of the drawings, an extruder 10 is shown in FIG. 1 which may be of conventional design and which extrudes in molten form a tube of thermoplastic material through a die 12. A non-contaminating gas, such as sterile air, is conveyed into the tube from a source 14 to provide an inflated tube 16. Generally a cooling ring 18 is positioned just downstream of the die 12 to accelerate the solidification of the thermoplastic material.

The blown tube 16 extends vertically upwardly from the die 12 and an inflated length of the tube thus extends from the die to a first pair of nip rolls, which flatten the tube and which are usually positioned some twenty feet or more above the die. Within the inflated length 20 of the tube 16 a pair of flattening rolls 22 are positioned which contact opposite sides of the tube to form two flattened tube portions 24 of a desired width (see FIG. 2). Due to the flattened portions 24, the tube 16 is receptive to the application thereto of layers of foil or other laminates 26, which are unrolled from rolls 28 thereof and trained around the rolls 22 for bonding to the tube 16.

In the case of foil laminates, the laminates would usually be provided with a layer of fusible material bonded to the foil, which fusible layer is melted or at least rendered tacky by heating the laminate just prior to its application to the tube 16. For this purpose heaters 30 are positioned immediately adjacent the rolls 22 for heating the face of the laminate which carries the fusible material into flat surface engagement with the blown film tube at flattened portions 24 thereof. Alternatively, of course, the laminate could be cemented to the tube.

The width of the laminates is selected such that their combined width is less than the total circumference of the tube, resulting in an uncovered portion of the tube extending longitudinally thereof. As seen in FIGS. 1 and 2 this uncovered portion comprises opposed, aligned, uncovered sections 32 positioned medially of the longitudinally extending edges 34 of the flattened web which results after the tube with the laminate applied thereto is flattened by an opposed pair of rollers 36.

Immediately downstream of the rollers 36 are a pair of transverse, seal-forming rollers 38, only one of which is shown but both of which are provided with heated, raised portions 40 which form transverse heat seal lines 42. The heat seal lines 42 bond not only the laminate to the underlying tube material but also opposed walls of the tube to each other. A conventional slit-seal mechanism 44 then seals and slits the composite web along the opposed longitudinal sections 32 to provide a pair of webs 46 and 48 each of which has a longitudinally extending uncovered portions 50 and 52, respectively, along one edge thereof.

While the transverse seals are shown in FIG. 1 as being formed prior to the slitting step it will be apparent that the order of these operations could be reversed. It will also be noted from FIG. 1 that the transverse seals 42 extend from a laminate covered edge of the flattened tube transversely of the tube, but do not extend across the uncovered sections of the tube. Thus, in a subsequent filling and sealing operation a continuous passage is provided across the mouths of the bags of the tube into which a filling pipe can be inserted.

Figure 3:
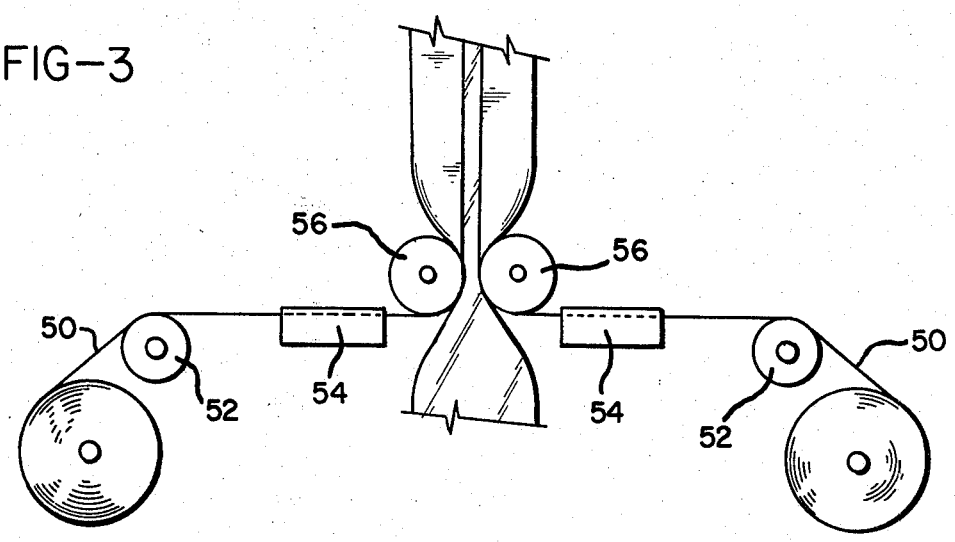
FIG. 3 is a view similar to FIG. 1 showing a second preferred embodiment of the invention.

FIG. 3 shows a modified version of the invention in which rolls of laminate 50 are trained around turning rolls 52 and led through heaters 54 which serve essentially the same function as the heaters 30 of the embodiment of FIG. 1; that is, to enhance the lamination of the material 50 to the tube. The laminates are then pressed into opposite sides of the inflated length of the tube by rollers 56 which also flatten the tube to provide opposed, flattened, laminate-receptive areas.

In the previous embodiments the simultaneous application of two laminates to the tube of material is disclosed, whereas in the embodiment of FIG. 4 a single sheet of laminate is applied to produce a single laminate covered web. As seen in FIG. 4, an extruder 10 is again used having a die 12 which extrudes a tube 60 inflated by a source of non-contaminating gas 62 to provide an inflated length 64.

A roll of material 66 may be positioned adjacent the inflated length 64 of the tube, and trained about a turning roller 68 prior to the laminate being trained about a tube former, a portion of which is shown at 70. The tube former 70 may be of conventional design, constituting a formed surface which directs the flat web of material into a tubular shape. As indicated any suitable tube former may be utilized and the tube former per se does not form part of the present invention.

A heater 72 may be positioned adjacent the face of the laminate being applied to the tube for the same purpose as the heaters 30 and 54, and it will be noted that the laminate is shaped to a circumference somewhat less than the circumference of the tube 60, causing the tube 60 to neck-in as it meets the laminate, which has the effect of pressing the tube outwardly against the tacky inner face of the laminate.

As the laminate covered tube extends upwardly it encounters a pair of opposed nip rollers 74, only one of which is shown in FIG. 4, which flatten the laminated tube. Because the laminate has a width less than the circumference of the tube 60, the longitudinal edges of the laminate are spaced from each other to provide an uncovered section 76 extending longitudinally of the laminated web. Following flattening of the laminated tube, it will be run through a transverse sealer, not shown, to provide transverse seal lines 77 as seen in FIG. 5, which extend from the covered edge 78 of the tube transversely thereof, but not entirely across the uncovered section 76.

While the forms of apparatus and article herein described constitute preferred embodiments of the invention, it is to be understood that the invention is not limited to these precise forms of apparatus and article, and that changes may be made therein without departing from the scope of the invention.

What is claimed is:

1. A process of manufacturing a laminated web of bags comprising the steps of:
   extruding in molten form a cylindrical tube of thermoplastic material,
   inflating said tube as it is extruded to provide an inflated length of said tube extending from said extruder,
   applying to said inflated length of said tube in sheet form a laminate of material which covers a major portion of the surface of said tube but has a total width less than the full circumference of said tube,
   flattening the combined tube and laminate without fusing opposed walls of said tube to each other and with a resulting uncovered portion of said tube extending longitudinally thereof, and
   sealing said laminate to said flattened tube and said opposed walls of said tube to each other along lines extending transversely of said flattened tube a distance less than the width of said flattened tube to provide a web of interconnected, laminated bags.

2. The process of claim 1 wherein said laminate applying step comprises:
   applying a single continuous sheet of material to less than the full circumference of said inflated length of said tube.

3. The process of claim 2 wherein:
   said step of flattening said combined tube and laminate comprises flattening said combined tube and laminate with said uncovered portion extending along a longitudinal edge of said combined tube and laminate.

4. The process of claim 1 wherein said laminate applying step comprises:
   applying a plurality of continuous sheets of material to less than the full circumference of said inflated length of said tube.

5. The process of claim 4 wherein said step of applying a plurality of sheets of material to said inflated length of said tube comprises:
   applying a pair of continuous sheets of material with opposed longitudinally extending edges of said sheets extending in spaced relationship to each other to provide a pair of longitudinally extending, uncovered sections of said tube.

6. The process of claim 5 wherein said step of flattening said combined tube and laminate comprises:
   flattening said combined tube and laminate with said pair of uncovered sections of said tube extending medially of longitudinally extending edges of the flattened tube.

7. The process of claim 6 wherein said tube flattening step comprises:
   flattening said tube with said pair of longitudinally extending uncovered sections of said tube in substantial alignment with each other.

8. The process of claim 7 further comprising:
   sealing and slitting said flattened tube longitudinally thereof along said uncovered sections thereof to provide a pair of laminate covered tubes each having an uncovered section extending along a sealed longitudinal edge thereof.

9. The process of claim 1 wherein said uncovered portion of said tube constitutes a section extending along an edge thereof and said sealing step comprises:
   sealing along lines extending from a first, laminate covered, longitudinally extending edge of said tube to a point spaced from an opposite, uncovered longitudinally extending edge thereof.

10. The process of claim 1 wherein said applying step comprises:
    training said laminate around a roll at least as long as said laminate is wide, and
    pressing said roll covered by said laminate against said inflated length of said tube.

11. The process of claim 1 further comprising:
    heating said laminate prior to applying it to said tube.

12. The process of claim 1 wherein said applying step comprises:
    training a pair of continuous sheets of material around a pair of rolls, and
    pressing said rolls covered with said sheets of material against opposite sides of said tube.

13. A process of manufacturing a laminated web comprising the steps of:
    extruding in molten form a cylindrical tube of thermoplastic material,
    inflating the tube as it is extruded to provide an inflated length of said tube extending from said extruder,
    providing a pair of elongated foil strips,
    training each of said strips around a roll at least as long as said foil strip is wide,
    pressing said rolls with said sheets of material trained thereabout against opposite sides of said tube to provide substantially flattened portions of said tube in contact with faces of said rolls, said flattened portions of said tube being at least as wide as the width of the strips of foil being pressed thereagainst,
    heating said foil strips prior to applying them to said tube,
    flattening said combined tube and foil laminates to provide a pair of aligned uncovered sections of said tube extending substantially centrally thereof, and
    sealing said strips of foil to said tube and opposed walls of said tube to each other along lines extending transversely of said tube inwardly from opposite longitudinally extending edges thereof to a point spaced from the center of said flattened tube.

* * * * *